UNITED STATES PATENT OFFICE.

HANS GOLDSCHMIDT, OF ESSEN-ON-THE-RUHR, GERMANY.

PROCESS OF MANUFACTURING STANNIC CHLORID FROM MATERIALS CONTAINING OXID OF TIN.

1,105,902. Specification of Letters Patent. Patented Aug. 4, 1914.

No Drawing. Application filed February 5, 1908. Serial No. 414,438.

*To all whom it may concern:*

Be it known that I, HANS GOLDSCHMIDT, a subject of the King of Prussia and German Emperor, and a resident of Essen-on-the-Ruhr, Germany, have invented certain new and useful Improvements in the Process of Manufacturing Stannic Chlorid from Materials Containing Oxid of Tin, of which the following is an exact specification.

It is well known that anhydrous metallic chlorids, as those of chromium, aluminium, silicon, tin, etc., are made according to Oerstedt (*Oversight over Sidenskabernes Selskabe Ferhandlinger* 25) by mixing the oxids with carbon and passing chlorin over this mixture when at a red heat. But this method has always been very difficult to carry out in practice, as iron apparatus could not be employed on account of being considerably attacked by chlorin at this temperature. One had to make the apparatus of refractory materials which, as it is known, cannot conveniently be tightened against leakage of chlorin at a high temperature and which, besides, show the other known drawbacks. It therefore must be considered a technical improvement if it is possible to make one of these anhydrous chlorids, in this case stannic chlorid, from the oxid at a low temperature in such a manner that the operation may be carried out in metallic vessels, without separating the metal in a reguline state. This result is attained according to my invention by dividing the process into two steps. The materials containing oxid of tin are reduced at a low temperature in such a manner that the metallic tin is produced in a finely divided state. The essential part of this method is already known, but there arises the question, how to bring out this finely divided tin. If the reduction is carried out with some care, that is to say, at a temperature of 900–1000°, adding a sufficient quantity of carbon (without too great an excess), a relatively solid, porous, conglobulated mass is obtained, and practically none of the tin will be lost by passing into the slag. In fact very little or no slag is formed in the process if these conditions are closely adhered to. By many experiments it has been shown that the finely divided tin contained in this mass may be transformed into stannic chlorid by the direct action of chlorin. It has been proved advantageous to subject this mass directly to chlorination instead of comminuting it, as the chlorin penetrates much better into this porous mass than into the powder, the surface represented by the latter being a much smaller one. The porous mass from the calcining furnace may be immediately brought into iron apparatus in which it is cooled and then acted upon by gaseous chlorin. It will be advantageous to work this part of the process in closed vessels under a pressure of about 1 atmosphere above atmospheric in order to convert all the tin contained in the mass into chlorid. The current of chlorin must be so regulated that the temperature in the apparatus remains below 100° C., in order to be sure that the iron will not be attacked. It is obvious that the chlorination should be performed, if anhydrous chlorid is desired, in a perfectly dry vessel, and that both the chlorin and the porous tin-holding mass should be perfectly dry, as the presence of water will cause the chlorin to act upon iron (both in the mass, and the walls of the vessel) and on many of the impurities present. This process is especially suited for using oxids of tin and rich tin ores, the impurities of which, such as iron, copper, lead, bismuth compounds and gangue will remain behind, the anhydrous chlorid of tin being run off, distilled or sucked off from the apparatus by decreasing the pressure. The result obtained by this method of chlorinating the finely divided tin is extremely good and the output will be practically quantitative.

Although it seems a simple matter to reduce all the tin present at a low temperature into metallic tin, the avoidance of oxidation of the finely divided tin always presents in practice, certain difficulties. But it has been found that even those quantities which may have been reoxidized or which may not have been reduced will be transformed into stannic chlorid on account, firstly of the presence of a sufficient quantity of carbon which will reduce any oxid present during the chlorination, and, secondly, on account of the local increases of temperature which will probably take place in the interior of the mass during the chlorination, at which increased temperature transformation of the oxid or protoxid of tin into chlorid will take place. In the apparatus itself there may be, at certain points, temperatures of considerably above 100° C., at which temperature the iron will not be attacked by dry chlorin. These local increases of temperature which of course are considerably higher than 100° C., will cause the entire chlorination to proceed with certainty.

As a specific example of the operation I give the following figures: 54 kg. of tin-paste (by which expression I mean dried hydrated tin oxid obtained in an impure state from the wash waters of silk dyers' works) containing about 65 per cent. Sn, are mixed with 11 kg. of anthracite coal and are heated in a muffle for about 6 hours at a temperature of 900–1000° C. There are obtained about 46 kg. of a conglobulated, porous mass from which are obtained, by the action of chlorin, 74.5 kg. anhydrous stannic chlorid, (corresponding to 34.0 kg. Sn). The residue consists of a conglobulated mass weighing about 13.4 kg. which contains about 2.48 per cent. of tin.

What I claim is:

1. The method of manufacturing anhydrous chlorid of tin from materials containing oxid of tin, which comprises first reducing the oxid of tin under conditions to produce a porous mass containing the tin in a metallic state, and then subjecting the latter to the action of chlorin gas.

2. The method of manufacturing anhydrous chlorid of tin from materials containing oxid of tin, which consists in first reducing the oxid of tin at a sufficiently low temperature to produce a porous mass containing metallic tin and then subjecting the latter to the action of chlorin gas.

3. The method of manufacturing anhydrous chlorid of tin from materials containing oxid of tin, which comprises first reducing the oxid of tin at a sufficiently low temperature to produce a porous mass containing metallic tin in a finely divided state and then subjecting the latter to the action of chlorin gas.

4. The method of manufacturing anhydrous chlorid of tin from materials containing oxid of tin, which comprises first reducing the oxid of tin at a sufficiently low temperature by means of carbon in a small excess to produce a porous mass containing metallic tin in a finely divided state and then subjecting the latter to the action of chlorin gas.

5. The method of manufacturing anhydrous chlorid of tin from materials containing oxid of tin, which comprises first reducing the oxid of tin at a sufficiently low temperature to produce a porous mass containing metallic tin and then subjecting the latter to the action of chlorin gas under pressure.

6. The method of manufacturing anhydrous chlorid of tin from materials containing oxid of tin which comprises first reducing the oxid of tin at a temperature not materially above 1000° to produce a porous mass containing metallic tin in a finely divided state and then subjecting the latter to the action of chlorin gas under pressure.

7. The method of manufacturing anhydrous chlorid of tin from materials containing oxid of tin, which comprises first reducing the oxid of tin at a sufficiently low temperature by means of carbon in a small excess to a permeable mass containing metallic tin in a finely divided state and then subjecting the latter to the action of chlorin gas under pressure.

8. The method of manufacturing anhydrous chlorid of tin from materials containing oxid of tin, which comprises first reducing the oxid of tin at a sufficiently low temperature to a permeable mass containing metallic tin and then subjecting the latter to the action of chlorin gas under pressure, at a temperature not greatly in excess of 100° C.

9. The method of manufacturing anhydrous chlorid of tin from materials containing oxid of tin, which comprises first reducing the oxid of tin at a sufficiently low temperature to produce a porous mass containing metallic tin in a finely divided state and then subjecting the latter to the action of chlorin gas under pressure at a temperature not greatly exceeding 100° C.

10. The method of manufacturing anhydrous chlorid of tin from materials containing oxid of tin, which comprises first reducing the oxid of tin at a sufficiently low temperature by means of carbon in a small excess to produce a porous mass containing metallic tin in a finely divided state and then subjecting the latter to the action of chlorin gas under pressure at a temperature not greatly in excess of 100° C.

11. The method of manufacturing anhydrous chlorid of tin from materials containing oxid of tin, which comprises first reducing the oxid of tin at a temperature sufficiently low to avoid the formation of slags and afterward subjecting the mass to the action of chlorin gas.

12. The method of manufacturing anhydrous chlorid of tin from materials containing oxid of tin, which comprises first reducing the oxid of tin at a temperature sufficiently low to avoid the formation of slags to metallic tin in a non-reguline state and afterward subjecting the mass to the action of chlorin gas.

13. The method of manufacturing anhydrous chlorid of tin from materials containing oxid of tin, which comprises first reducing the oxid of tin at a temperature sufficiently low to avoid the formation of slags by means of carbon in a small excess, to metallic tin in a non-reguline state and afterward subjecting the mass to the action of chlorin gas.

14. The method of manufacturing anhydrous chlorid of tin from materials containing oxid of tin, which comprises first reducing the oxid of tin at a temperature sufficiently low to avoid the formation of slags and afterward subjecting the mass to the action of chlorin gas under pressure.

15. The method of manufacturing anhydrous chlorid of tin from materials containing oxid of tin, which comprises first reducing the oxid of tin at a temperature sufficiently low to avoid the formation of slags to metallic tin in a nonreguline state and afterward subjecting the mass to the action of chlorin gas under pressure.

16. The method of manufacturing anhydrous chlorid of tin from materials containing oxid of tin, which comprises first reducing the oxid of tin at a temperature sufficiently low to avoid the formation of slags by means of carbon in a small excess to metallic tin in a non-reguline state and afterward subjecting the mass to the action of chlorin gas under pressure.

17. The method of manufacturing anhydrous chlorid of tin from materials containing oxid of tin, which comprises first reducing the oxid of tin at a temperature sufficiently low to avoid the formation of slags and afterward subjecting the mass to the action of chlorin gas under pressure at a temperature not greatly exceeding 100° C.

18. The method of manufacturing anhydrous chlorid of tin from materials containing oxid of tin, which comprises first reducing the oxid of tin at a temperature sufficiently low to avoid the formation of slags to metallic tin in a non-reguline state and afterward subjecting the mass to the action of chlorin gas under pressure at a temperature not greatly exceeding 100° C.

19. The method of manufacturing anhydrous chlorid of tin from materials containing oxid of tin, which comprises first reducing the oxid of tin at a temperature sufficiently low to avoid the formation of slags by means of carbon in a small excess to metallic tin in a non-reguline state and afterward subjecting the mass to the action of chlorin gas under pressure at a temperature not greatly exceeding 100° C.

20. A process of making anhydrous stannic chlorid which comprises subjecting material containing tin oxid to a reduction process at such a temperature as to avoid the formation of slag and the passage of tin into slag, then treating the product of the reduction in a dry state and free from slag and in dry tanks to a current of dry chlorin.

21. A process of making anhydrous stannic chlorid which comprises subjecting material containing tin oxid to a reduction process at such a temperature as to avoid the formation of slag and the passage of tin into slag, then treating the product of the reduction in a dry state and free from slag and in dry tanks to a current of dry chlorin under pressure.

22. A process of making anhydrous stannic chlorid which comprises subjecting material containing tin oxid to a reduction process at such a temperature as to avoid the formation of slag and the passage of tin into slag, then treating the product of the reduction in a dry state and free from slag and in dry tanks to a current of dry chlorin.

23. In the manufacture of stannic chlorid, the step of reacting upon a spongy, pervious mass containing metallic tin, with chlorin gas.

24. In the manufacture of stannic chlorid, the step of reacting upon a spongy, pervious mass containing metallic tin, and impurities not readily attacked by chlorin with chlorin gas.

25. In the manufacture of stannic chlorid, the step of reacting upon a spongy, pervious mass containing metallic tin, and other metals, the chlorids of which are not readily soluble in anhydrous stannic chlorid, with chlorin gas.

26. In the manufacture of stannic chlorid, the step of reacting upon a spongy, pervious mass containing metallic tin, with chlorin gas, under pressure.

27. In the manufacture of stannic chlorid, the step of reacting upon a spongy, pervious mass containing metallic tin, with chlorin gas, under a pressure of about one atmosphere above normal.

28. In the manufacture of stannic chlorid, the step of reacting upon a spongy, pervious mass containing metallic tin, with chlorin gas, at a temperature not considerably above 100° C.

29. In the manufacture of stannic chlorid, the step of reacting upon a dry, spongy, pervious mass containing metallic tin, with dry chlorin gas, at a temperature not materially above 100° C.

30. In the manufacture of stannic chlorid, the step of reacting upon a dry, spongy, pervious mass containing metallic tin, with dry chlorin gas, at a temperature not considerably above 100° C., and under pressure.

31. A process of making stannic chlorid which comprises reducing tin oxid to a pervious, spongy mass containing metallic tin, and thereafter reacting thereupon with chlorin gas.

32. A process of making anhydrous stannic chlorid which comprises subjecting material containing tin oxid to a reduction process at such a temperature as to avoid the formation of slag and the passage of tin into slag, and thereafter treating the product of this reduction in a dry state and free from slag and in dry tanks to a current of dry chlorin, at a temperature not greatly exceeding 100° C.

33. A process of making anhydrous stannic chlorid which comprises subjecting material containing tin oxid to a reduction process at such temperature as to avoid the formation of slag and the passage of tin into slag and thereafter treating the product of this reduction in a dry state and free from slag and in dry tanks to a current of dry chlorin under pressure, at a temperature not greatly exceeding 100° C.

34. A process of making anhydrous stannic chlorid which comprises subjecting material containing tin oxid to a reduction process at such a temperature as to avoid the formation of slag and the passage of tin into slag, and thereafter treating the product of this reduction with chlorin gas.

35. A process of converting an oxid of an element into a chlorid, which comprises reacting on said oxid with a reducing agent at a temperature sufficiently low to form a porous, pervious mass containing the element in a finely divided state, and to avoid the formation of a slag; and thereafter treating said porous, pervious mass with a chloridizing gas at a temperature at which said gas attacks said element.

36. A process of converting an oxid of an element into a chlorid, which comprises reacting on said oxid with a reducing agent at a temperature sufficiently low to form a porous, pervious mass containing the element in a finely divided state, and to avoid the formation of a slag; and thereafter treating said porous, pervious mass with a chloridizing gas under pressure, and at a temperature at which said gas attacks said element.

37. A process of converting an oxid of an element into a chlorid, which comprises reacting on said oxid with a reducing agent at a temperature sufficiently low to form a porous, pervious mass containing the element in a finely divided state, and to avoid the formation of a slag; thereafter treating said porous, pervious mass with a chloridizing gas at a temperature at which said gas atacks said element, and thereafter separating the chlorid from the other material remaining.

38. A process of converting an oxid of an element into a chlorid, which comprises reacting on said oxid with a reducing agent at a temperature sufficiently low to form a porous, pervious mass containing the element in a finely divided state, and to avoid the formation of a slag; and thereafter treating said porous, pervious mass with chlorin gas at a temperature at which said gas attacks said element.

39. A process of converting an oxid of an element into a halogen compound, which comprises reacting on said oxid with a reducing agent at a temperature sufficiently low to form a porous, pervious mass containing the element in a finely divided state, and to avoid the formation of a slag; and thereafter treating said porous, pervious mass wih a halogenizing agent at a temperature at which said agent attacks said element.

Signed at New York, in the county of New York, and State of New York, this 13th day of December, A. D. 1907.

HANS GOLDSCHMIDT.

Witnesses:
HUBERT E. ROGERS,
F. H. HIRSCHLAND.